US012297057B2

(12) United States Patent
Matsuka et al.

(10) Patent No.: US 12,297,057 B2
(45) Date of Patent: May 13, 2025

(54) SAMPLE TRANSPORT DEVICE AND SAMPLE TRANSPORT CARRIER

(71) Applicant: HITACHI HIGH-TECH CORPORATION, Tokyo (JP)

(72) Inventors: Takeshi Matsuka, Tokyo (JP); Shigeki Yamaguchi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 97 days.

(21) Appl. No.: 18/008,462

(22) PCT Filed: Mar. 5, 2021

(86) PCT No.: PCT/JP2021/008788
§ 371 (c)(1),
(2) Date: Dec. 6, 2022

(87) PCT Pub. No.: WO2022/009470
PCT Pub. Date: Jan. 13, 2022

(65) Prior Publication Data
US 2023/0202779 A1    Jun. 29, 2023

(30) Foreign Application Priority Data
Jul. 10, 2020  (JP) ................................. 2020-119110

(51) Int. Cl.
*B65G 54/02* (2006.01)
*G01N 35/04* (2006.01)

(52) U.S. Cl.
CPC .............. *B65G 54/02* (2013.01); *G01N 35/04* (2013.01); *G01N 2035/0477* (2013.01)

(58) Field of Classification Search
CPC ............ B65G 54/02; B65G 2201/0261; B65G 17/323; B65G 47/847; G01N 2035/0477;
(Continued)

(56) References Cited

U.S. PATENT DOCUMENTS 5,651,941 A * 7/1997 Stark ...................... G01N 35/04
  422/562
5,720,377 A * 2/1998 Lapeus ................. G01N 35/04
  198/465.1
(Continued)

FOREIGN PATENT DOCUMENTS

JP  03-107766 A   5/1991
JP  2015-503089 A 1/2015
(Continued)

OTHER PUBLICATIONS

International Preliminary Report on Patentability received in corresponding International Application No. PCT/JP2021/008788 dated Jan. 19, 2023.
(Continued)

*Primary Examiner* — Gene O Crawford
*Assistant Examiner* — Muhammad Awais
(74) *Attorney, Agent, or Firm* — MATTINGLY & MALUR, PC (57) ABSTRACT

Provided are a specimen transport device and a specimen transport carrier capable of preventing shake of a specimen as compared with related art without limiting a transport path in electromagnetic transport. A specimen carrier 100 includes two or more gripping portions 101 configured to support specimen containers 150 having different diameters from different directions, and a transport surface 201 on which the specimen carrier 100 is to slide. The specimen carrier 100 includes a direction adjustment unit configured to adjust a traveling direction of the specimen carrier 100 when the specimen carrier 100 slides on a surface of the transport surface 201, such that a direction of a force with which one of the two or more gripping portions 101 grips the specimen container 150 is opposite to the traveling direction of the specimen carrier 100.

5 Claims, 7 Drawing Sheets (58) Field of Classification Search
CPC ............ G01N 2035/0406; G01N 35/04; B65B 43/46; B65B 23/08; B65B 21/12; B65B 21/18
USPC .......................................................... 198/619
See application file for complete search history.

(56) References Cited

U.S. PATENT DOCUMENTS

| | | | | |
|---|---|---|---|---|
| 5,941,366 A | * | 8/1999 | Quinlan | ............... G01N 35/04 198/465.1 |
| 2005/0271555 A1 | * | 12/2005 | Itoh | ...................... G01N 35/04 422/400 |
| 2014/0234978 A1 | | 8/2014 | Heise et al. | |
| 2014/0326082 A1 | * | 11/2014 | Hirama | ................... G01N 1/00 73/863.92 |
| 2015/0034461 A1 | | 2/2015 | Hecht | |
| 2015/0177268 A1 | | 6/2015 | Reisch et al. | |
| 2018/0106820 A1 | | 4/2018 | Okabe et al. | |
| 2021/0356485 A1 | | 11/2021 | Yamaguchi et al. | |

FOREIGN PATENT DOCUMENTS

| | | | | |
|---|---|---|---|---|
| JP | 2015-508891 A | | 3/2015 | |
| JP | 2016203309 A | * | 12/2016 | |
| JP | 2019-78769 A | | 5/2019 | |
| JP | 2020-51961 A | | 4/2020 | |
| JP | 2020-112459 A | | 7/2020 | |
| WO | 2016/158122 A1 | | 10/2016 | |
| WO | WO-2019116796 A1 | * | 6/2019 | ............. G01N 35/04 |

OTHER PUBLICATIONS

International Search Report of PCT/JP2021/008788 dated May 25, 2021.
Extended European Search Report received in corresponding European Application No. 21838744.7 dated Jun. 25, 2024.

* cited by examiner

SAMPLE TRANSPORT DEVICE AND SAMPLE TRANSPORT CARRIER

TECHNICAL FIELD

The present invention relates to a specimen transport device and a specimen transport carrier for transporting a specimen container in a specimen examination automation system.

BACKGROUND ART

For the purpose of preventing wear on a gripping surface of a manipulator when the manipulator holds a bucket on which a sample container is mounted, PTL 1 discloses that a plurality of fingers of the manipulator include branch portions extending downward and claw portions bent from lower end portions of the branch portions toward a central axis side of the manipulator. The bucket includes a protruding rod. The protruding rod includes a shaft, an umbrella portion including a flange portion that protrudes in a horizontal direction from a side surface of the shaft, and a slider that is slidable up and down below the umbrella portion along an outer periphery of the side surface of the shaft. The plurality of fingers are moved upward together with the slider in a state of gripping the slider, and the claw portions are caught by the flange portion in the process.

CITATION LIST

Patent Literature

PTL 1: JP-A-2016-203309

SUMMARY OF INVENTION

Technical Problem

In recent years, labor-saving and speeding up of an examination using an automated device have been promoted in specimen examination for the purpose of diagnosis in the medical field.

Therefore, in a specimen examination automation system, a pre-processing device, an automatic analysis device, and a post-processing device are connected to each other by a specimen transport device to fully automate an operation related to blood analysis processing.

A specimen carrier on which one specimen container containing a specimen can be mounted is used in transport of the specimen in such an automated system. As an example, there has been known a method in which a plurality of electromagnets fixed and arranged below a transport surface generates a magnetic field to cause magnets in specimen carriers to attract and repel, thereby causing the specimen carrier to slide on the transport surface. This transport method enables two-dimensional specimen transport instead of one-dimensional specimen transport.

In this case, it is important to prevent liquid shake of the specimen, since shake of the specimen may affect an analysis result. Therefore, it is desirable to transport the specimen container itself without shake. However, specimen containers having different diameters are placed on the specimen carrier, and it is difficult to finely control a force when transporting the specimen carrier by the attraction and repulsion of the electromagnets. Therefore, it is difficult to prevent the shake of the specimen container.

PTL 1 discloses that a direction of the specimen carrier is corrected by acting from a side surface of the specimen carrier in a one-dimensional belt transport system. However, with such a technique, when an attempt is made to access the specimen carrier from the side surface in two-dimensional specimen transport, various problems occur, such as a transport path being limited and a transport time becoming long.

The invention provides a specimen transport device and a specimen transport carrier capable of preventing shake of a specimen as compared with related art without limiting a transport path in electromagnetic transport.

Solution to Problem

The invention includes a plurality of methods for solving the above problems, and an example thereof is a specimen transport device. The specimen transport device includes a carrier including two or more gripping portions configured to support specimen containers having different diameters from different directions, and a transport surface on which the carrier is to slide. The carrier includes a direction adjustment unit configured to adjust a traveling direction of the carrier when the carrier slides on a surface of the transport surface, such that a direction of a force with which one of the two or more gripping portions grips the specimen container is opposite to the traveling direction of the carrier.

Advantageous Effects of Invention

According to the invention, shake of a specimen is prevented as compared with related art without limiting a transport path in electromagnetic transport. Objects, configurations, and effects other than those described above will be clarified by describing the following embodiment.

DESCRIPTION OF EMBODIMENTS

A specimen transport device and a specimen transport carrier according to an embodiment of the invention will be described with reference to FIGS. 1 to 11. In the drawings used in this description, the same or corresponding components are denoted by the same or similar reference numerals, and repeated descriptions of these components may be omitted.

Figure 1:
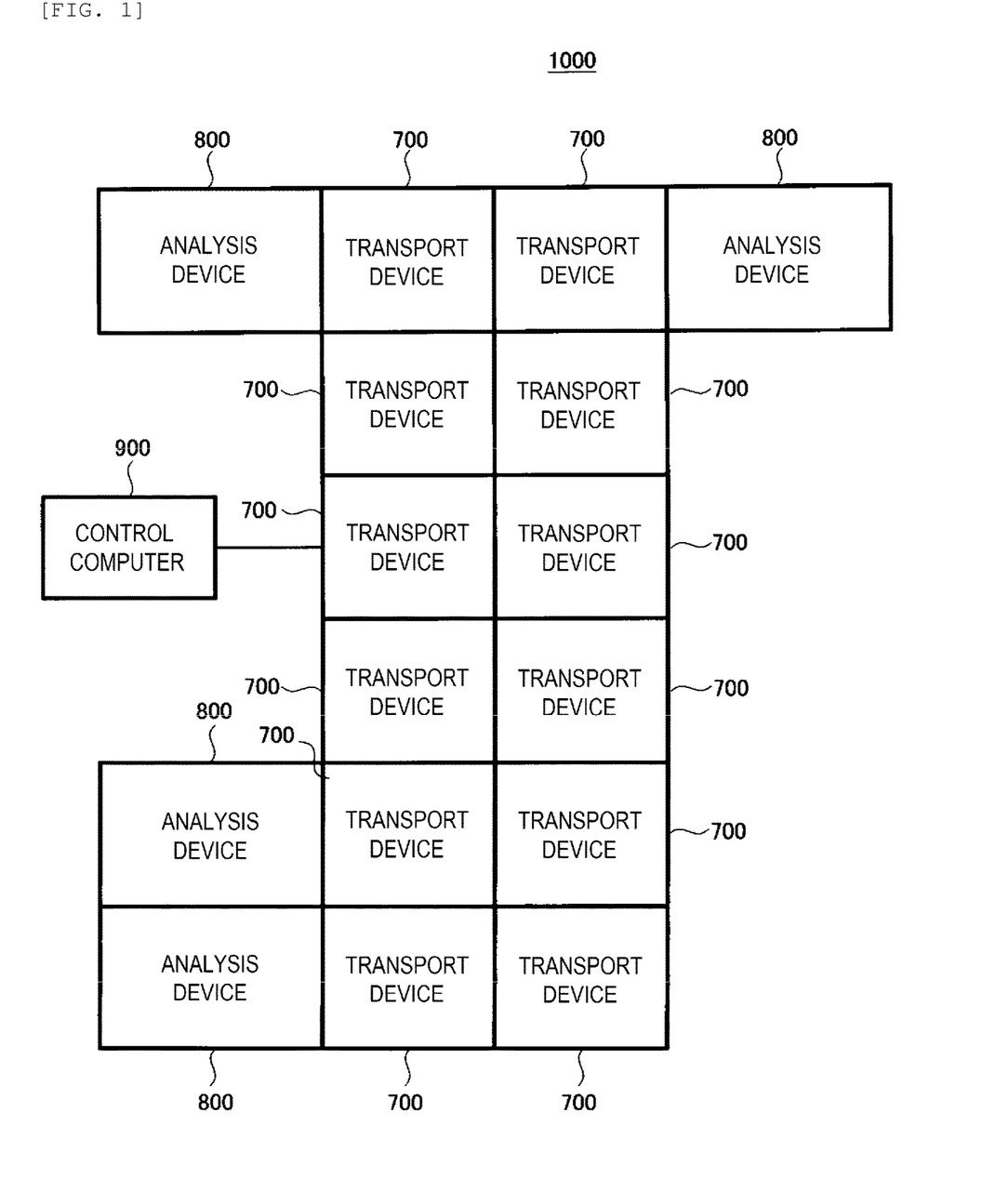
FIG. 1 is a schematic plan view showing an overall configuration of a specimen examination automation system according to an embodiment of the invention.
Figure 2:
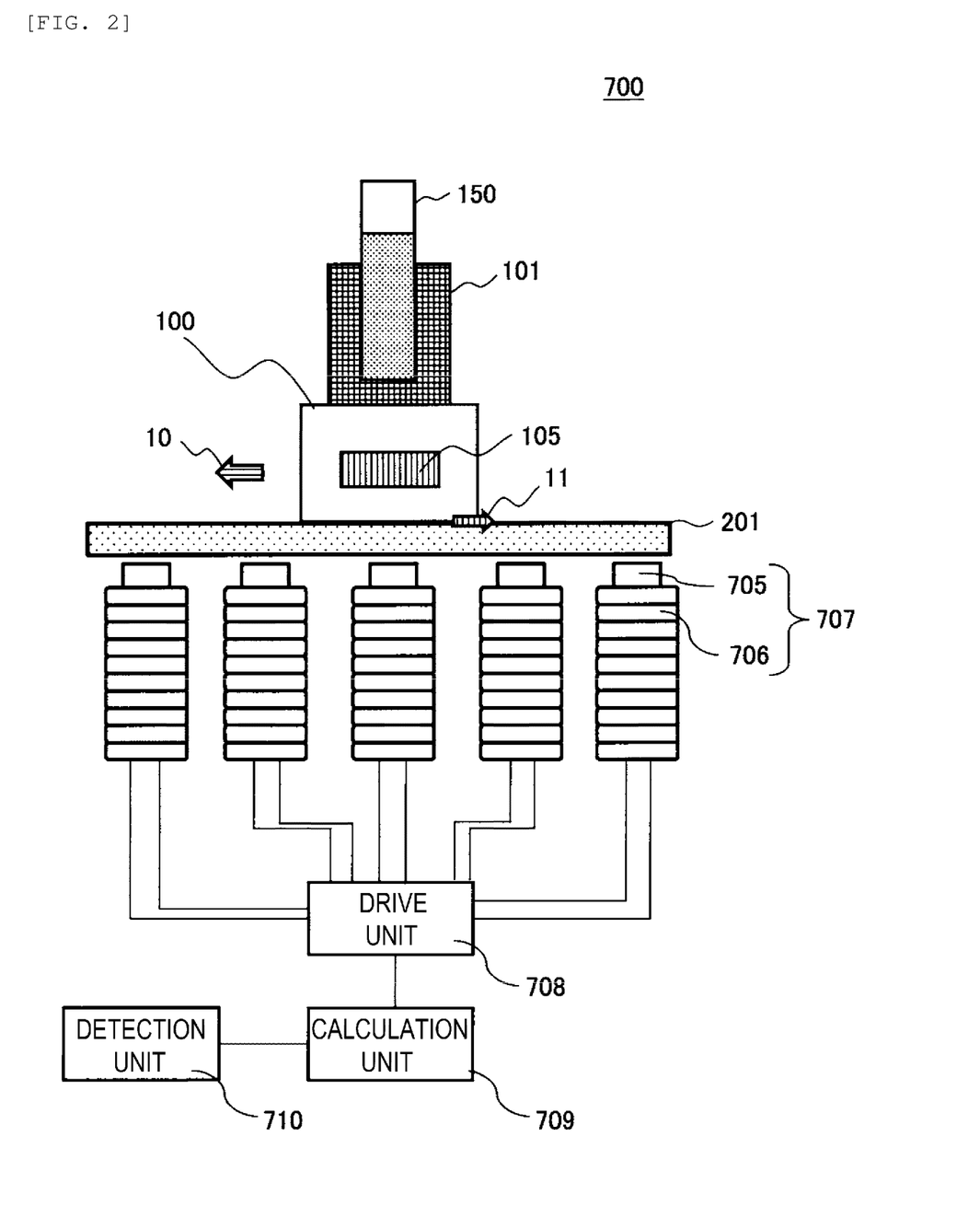
FIG. 2 is a diagram showing a schematic configuration of a transport device constituting the specimen examination automation system according to the embodiment.

First, an overall configuration of a specimen examination automation system will be described with reference to FIGS. 1 and 2. FIG. 1 is a plan view showing the overall configuration of the specimen examination automation system according to the embodiment of the invention. FIG. 2 is a diagram showing a schematic configuration of a transport device constituting the specimen examination automation system according to the embodiment.

A specimen examination automation system 1000 according to the present embodiment shown in FIG. 1 is a system including analysis devices for automatically analyzing ingredients of a specimen such as blood and urine.

Main components of the specimen examination automation system 1000 include a plurality of transport devices 700 (twelve transport devices 700 in FIG. 1) that transport an empty holder or a specimen carrier 100 (see FIG. 2) on which a specimen container 150 (see FIG. 2 and the like) containing a specimen such as blood or urine is mounted, a plurality of analysis devices 800 (four analysis devices 800 in FIG. 1), and a control computer 900 that integrally manages the specimen examination automation system 1000.

The analysis device 800 is a unit for performing qualitative and quantitative analysis of ingredients of a specimen transported by the transport device 700. Analysis items in this unit are not particularly limited, and a configuration of a known automatic analysis device for analyzing biochemical items and immune items can be employed. Further, when a plurality of analysis devices 800 are provided, the analysis devices 800 may be the same or different specifications, and are not particularly limited.

Each transport device 700 is a device that transports a specimen mounted on the specimen carrier 100 to a destination by causing the specimen carrier 100 to slide on a transport path by an interaction between magnetic poles 707 (see FIG. 2) and a magnetic body 105 (see FIG. 2) provided in the specimen carrier 100. Details thereof will be described in detail with reference to FIG. 2 and subsequent drawings.

The control computer 900 controls an operation of the overall system including the transport devices 700 and the analysis devices 800, and is implemented by a computer including a display device such as a liquid crystal display, an input device, a storage device, a CPU, a memory, and the like. The control of the operation of each device by the control computer 900 is executed based on various programs recorded in the storage device.

An operation control processing executed by the control computer 900 may be integrated into one program, may be divided into a plurality of programs, or may be performed in a combination thereof. Further, a part or all of the programs may be implemented by a dedicated hardware, or may be modularized.

In FIG. 1 described above, the case where four analysis devices 800 are provided is described, but the number of the analysis devices is not particularly limited and may be one or more. Similarly, the number of the transport devices 700 is not particularly limited and may be one or more.

In addition, the specimen examination automation system 1000 can be provided with various specimen pre-processing and post-processing units that perform pre-processing and post-processing on a specimen. A detailed configuration of the specimen pre-processing and post-processing units is not particularly limited, and a configuration of a known pre-processing device can be adopted.

Next, a configuration of the transport device 700 according to the present embodiment will be described with reference to FIG. 2.

As shown in FIG. 2, a plurality of specimen carriers 100 on which the specimen container 150 containing a specimen is mounted are provided in the transport device 700. The magnetic body 105 is provided on a bottom surface portion of each of the plurality of specimen carriers 100.

The magnetic body 105 is implemented by a permanent magnet such as neodymium and ferrite, but may be implemented by other magnets, soft magnetic materials, or an appropriate combination thereof.

The specimen carrier 100 including the magnetic body 105 is caused to move to slide on a transport surface 201. In order to generate the transport force, a plurality of magnetic poles 707 each including a cylindrical core 705 and a winding 706 wound around an outer periphery of the core 705 are provided at a lower portion of the transport surface 201. The magnetic poles 707 constitute a plurality of detection points for detecting a position of the magnetic body 105. A plurality of transport paths are provided above the magnetic poles 707 so as to cover the magnetic poles 707.

In the transport device 700 according to the present embodiment, the plurality of magnetic poles 707 provided therein are used to detect the position of the magnetic body 105 and are also used to transport the magnetic body 105, that is, to transport a specimen.

The magnetic poles 707 are connected to a drive unit 708 that applies predetermined voltages to the magnetic poles 707 to cause predetermined currents to flow through the windings 706. The magnetic pole 707 to which the voltage is applied by the drive unit 708 acts as an electromagnet, and attracts the magnetic body 105 provided in the specimen carrier 100 on the transport surface 201. After the specimen carrier 100 is attracted by the magnetic pole 707, the magnetic body 105 provided in the specimen carrier 100 is attracted to the adjacent magnetic poles 707 by stopping a voltage application from the drive unit 708 to the magnetic pole 707 and applying the voltage from the drive unit 708 to the different magnetic poles 707 adjacent to the magnetic pole 707 in the same manner as described above.

By repeating this procedure on all the magnetic poles 707 constituting the transport path, the specimen accommodated in the specimen container 150 held in the specimen carrier 100 provided with the magnetic body 105 is transported to a destination.

A calculation unit 709 calculates the current flowing through each winding 706 using various pieces of information such as position information, speed information, and weight information of the specimen carrier 100, and outputs a command signal to each drive unit 708. The drive unit 708 applies a voltage to the corresponding winding 706 based on the command signal.

A configuration of a detection unit 710 is not particularly limited as long as the detection unit 710 can detect the position of the specimen container 150. For example, a Hall sensor, a length measuring device, or the like that detects a magnetic flux of the magnetic body 105 of the specimen container 150 can be used to directly detect the position of the specimen container 150. Further, the position of the specimen container 150 can be determined indirectly by detecting the current flowing through the winding 706 of the magnetic pole 707 and a flow method thereof to determine the position of the magnetic body 105.

The configuration of the transport device 700 is not limited to the configuration described above, and for example, the transport device 700 may be configured to perform electromagnetic transport on a one-dimensional transport path.

Figure 3:
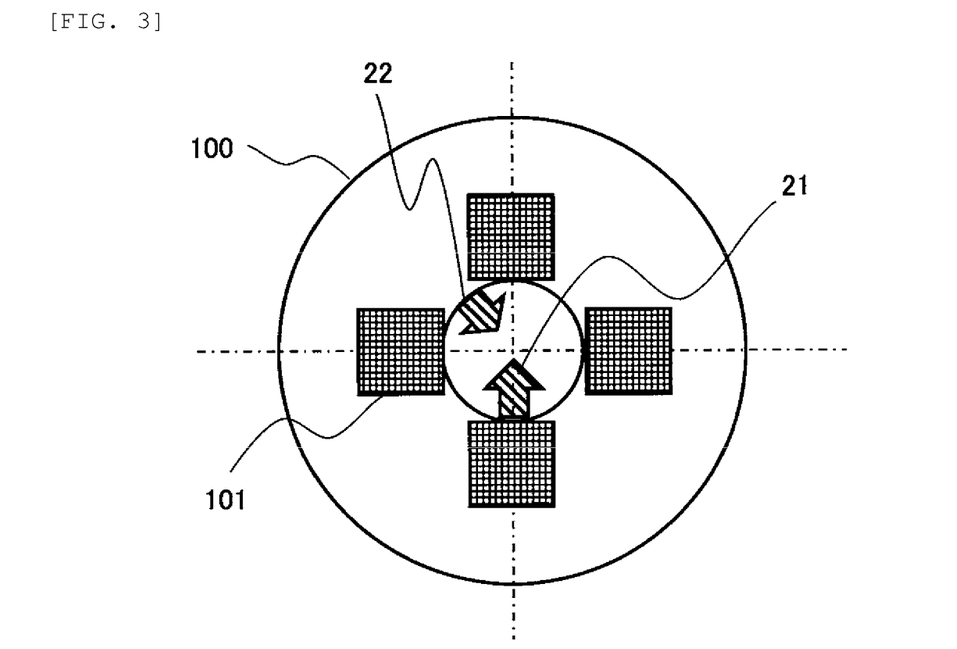
FIG. 3 is a diagram showing a mechanism in which a specimen carrier on a transport path holds a specimen container from a bottom surface side.

Next, a characteristic configuration of the specimen carrier will be described with reference to FIGS. 3 to 11. FIG. 3 is a diagram showing a mechanism in which the specimen carrier on the transport path holds the specimen container from a bottom surface side.

As shown in FIGS. 2 and 3, a specimen to be examined in the specimen examination automation system 1000 is handled in a state of being collected and held in the specimen container 150. The specimen container 150 is inserted into the specimen carrier 100 manually by an operator or by an automatic insertion unit, transported through the system, and subjected to various processes.

Here, the specimen container 150 inserted into the specimen carrier 100 does not have a limited diameter. Therefore, the specimen carrier 100 includes two or more (four in FIG. 3) gripping portions 101 that support the specimen containers 150 having different diameters from different directions, and the four gripping portions 101 are closed or opened in accordance with the diameter of the specimen container 150 and hold the specimen containers 150 at intervals of 90°. In such a gripping method, a portion where the gripping portion 101 and the specimen container 150 are in contact with each other has a large gripping force 21 for gripping the specimen, and a portion between the gripping portion 101 and the adjacent gripping portion 101 has a small gripping force 22.

Figure 4:
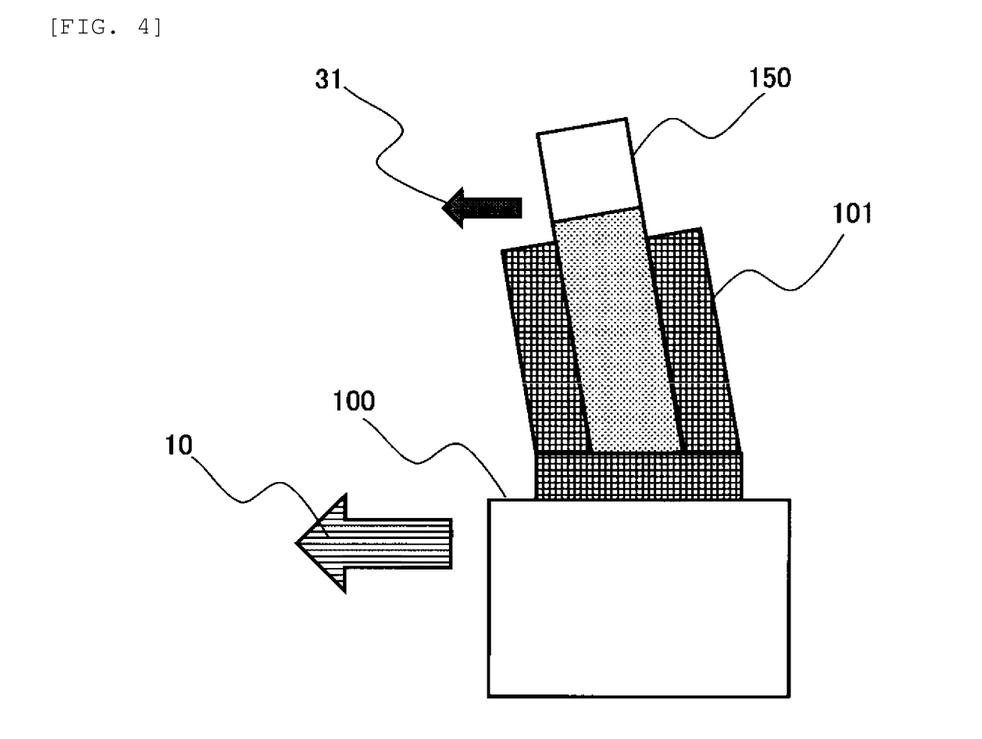
FIG. 4 is a diagram showing an inclination of the specimen container being transported.

FIG. 4 is a diagram showing an inertia when deceleration occurs while the specimen carrier 100 is being transported. As shown in FIG. 4, an inertia 31 acts on the specimen container 150 when the specimen carrier 100 decelerates. When an inertia 31 that exceeds the gripping force of the gripping portion 101 acts, the gripping portion 101 is pushed open and the specimen container 150 is inclined. When there is no change in speed and the inertia 31 disappears, the gripping portion 101 that has been pushed open is closed and the specimen container 150 stands upright. The action of the specimen container 150 causes the specimen in the specimen container 150 to shake.

In order to prevent such shake of the specimen, it is required to align the large gripping force 21 in a direction against the inertia 31 applied to the specimen container 150 during deceleration. Therefore, it is required to adjust a traveling direction 10 of the specimen carrier 100 when the specimen carrier 100 slides on a surface of the transport surface 201, such that a direction of a force with which one of the two or more gripping portions 101 grips the specimen container 150 is opposite to the traveling direction of the specimen carrier 100.

Figure 5:
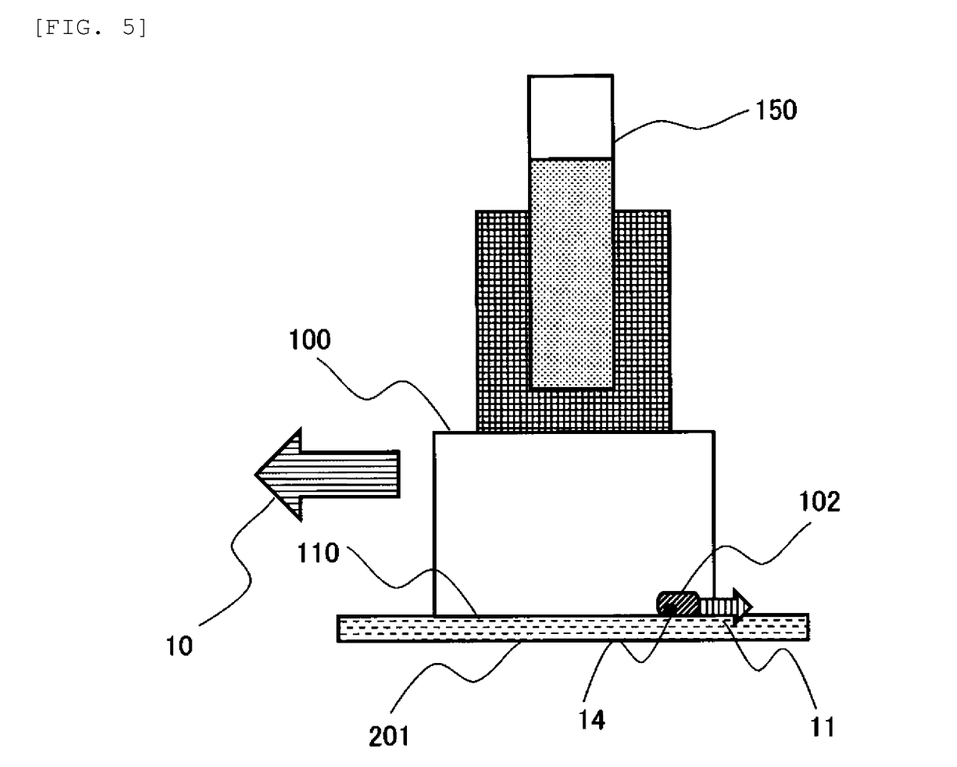
FIG. 5 is a diagram showing a configuration of the specimen carrier according to the invention as viewed from a side surface side.
Figure 6:
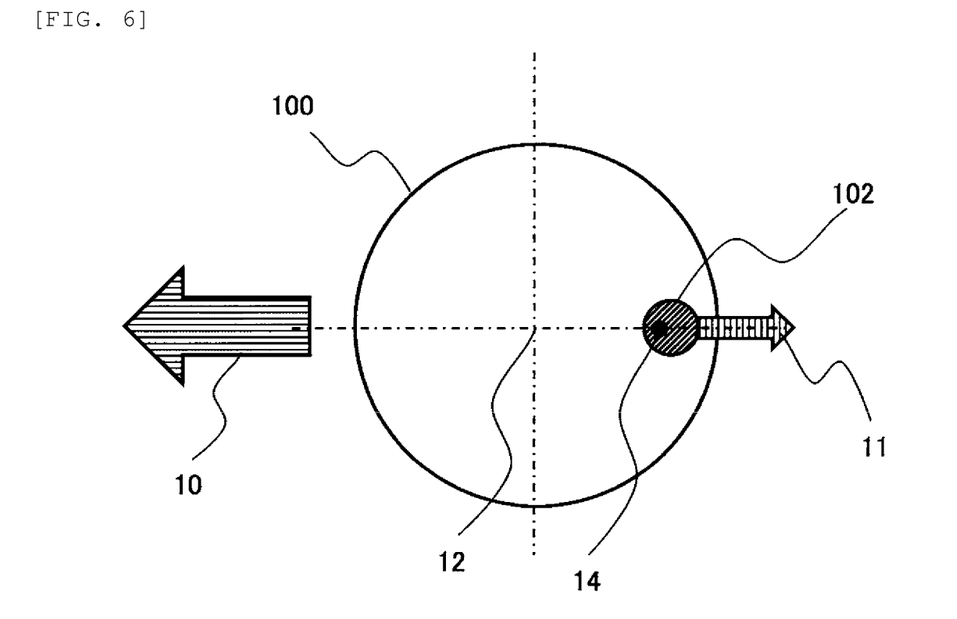
FIG. 6 is a diagram showing a configuration of the specimen carrier according to the invention as viewed from a bottom surface side.

FIG. 5 is a diagram showing a configuration of the specimen carrier as viewed from a side surface side, and FIG. 6 is a diagram showing a configuration of the specimen carrier as viewed from a bottom surface side.

As shown in FIGS. 5 and 6, in the invention, as a direction adjustment unit that adjusts the traveling direction of the specimen carrier 100, a high friction member 102 having a friction coefficient with respect to the transport surface 201 higher than that of a material constituting the specimen carrier 100 is installed at a position shifted from a central axis 12 of the specimen carrier 100 on a bottom surface 110 of the specimen carrier 100. The high friction member 102 is provided at a position opposite to one of the two or more gripping portions 101 by 180°.

Thus, an interaction between the bottom surface 110 of the specimen carrier 100 and the transport surface 201, that is, a center 14 of a frictional force 11 acting on the bottom surface 110 of the specimen carrier 100 can be positioned away from the central axis 12 of the specimen carrier 100.

Figure 7:
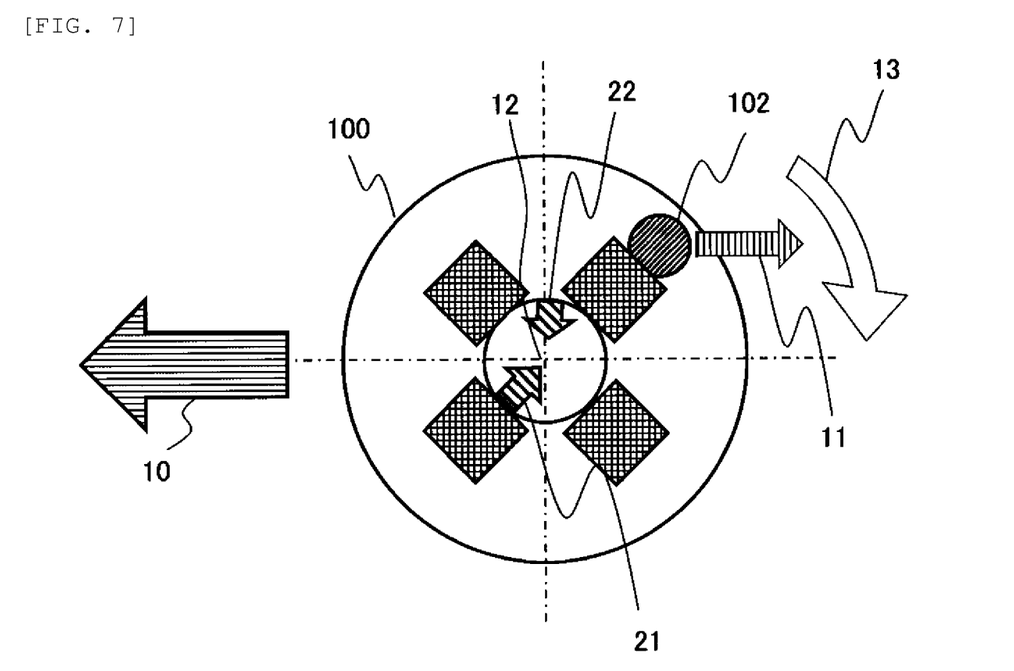
FIG. 7 is a diagram showing an operation principle according to the invention as viewed from the bottom surface side of the specimen carrier.
Figure 8:
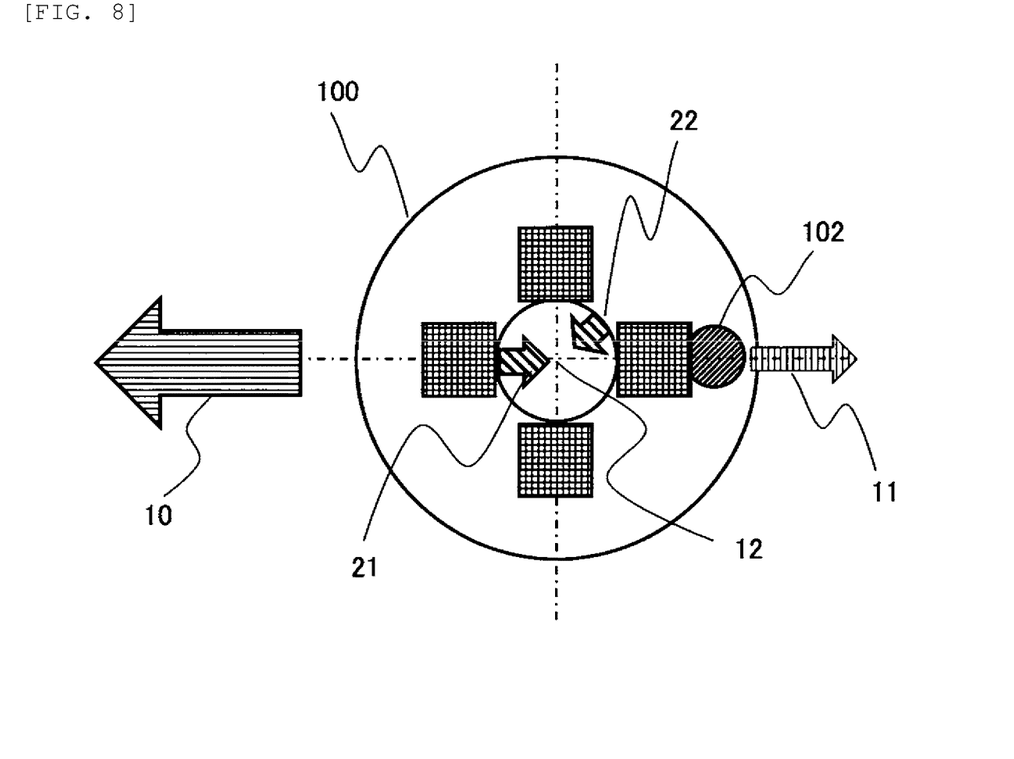
FIG. 8 is a diagram showing the operation principle according to the invention as viewed from the bottom surface side of the specimen carrier.

FIGS. 7 and 8 are diagrams showing an operation principle of a direction alignment by the frictional force as viewed from the bottom surface side of the specimen carrier.

In such a configuration, as shown in FIG. 7, when the transport is started, the frictional force 11 due to the transport acts in a direction opposite to the traveling direction 10 of the specimen carrier 100 by 180°.

In this case, when there is a component force of the frictional force 11 in a direction orthogonal to a straight line formed by the central axis 12 of the specimen carrier 100 and the center 14 of the frictional force 11, a rotational force 13 acts as shown in FIG. 7. The rotational force causes the specimen carrier 100 to rotate as the specimen carrier 100 travels in the transport direction.

As shown in FIG. 8, when the high friction member 102 is positioned on a side opposite to the traveling direction 10 by 180°, the straight line formed by the central axis 12 and the center 14 of the frictional force is parallel to the direction of the frictional force 11, and the component force of the frictional force in the direction of the rotational force 13 is eliminated. Therefore, the rotational force 13 is not applied, the rotation is stopped, and the specimen carrier 100 is transported to a predetermined position with the high friction member 102 disposed on a rear side in the traveling direction 10.

In this manner, the specimen carrier 100 can be automatically rotated along with the transport, so that the specimen carrier 100 can be aligned in a certain direction with respect to the transport direction, and a direction in which the large gripping force 21 acts most strongly can be automatically aligned opposite to the traveling direction 10. Accordingly, the large gripping force 21 is aligned in a direction parallel to the inertia 31 of the specimen container during deceleration, so that it is possible to effectively prevent the inclination of the specimen container 150 at the time of deceleration of the specimen carrier 100.

Although the embodiment in which one high friction member 102 is provided has been described, the invention is not limited thereto. As an example, a configuration may be used in which three high friction members 102 are disposed on the bottom surface of the carrier to align the carrier in one of three directions.

As described above, the shake of the specimen container 150 can be prevented by a simple mechanism.

Figure 9:
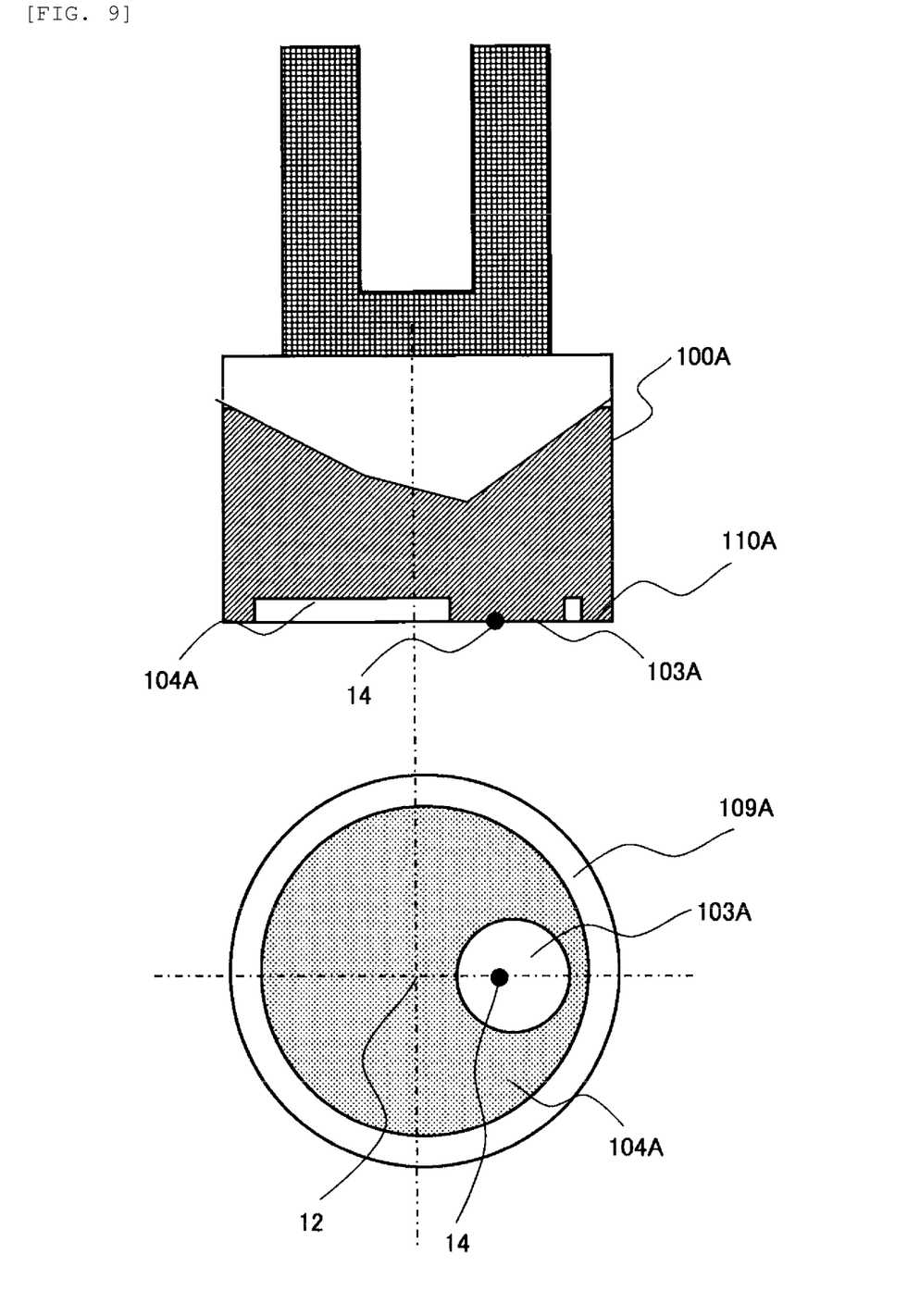
FIG. 9 is a diagram showing another configuration of the specimen carrier according to the invention as viewed from the side surface side and the bottom surface side.
Figure 10:
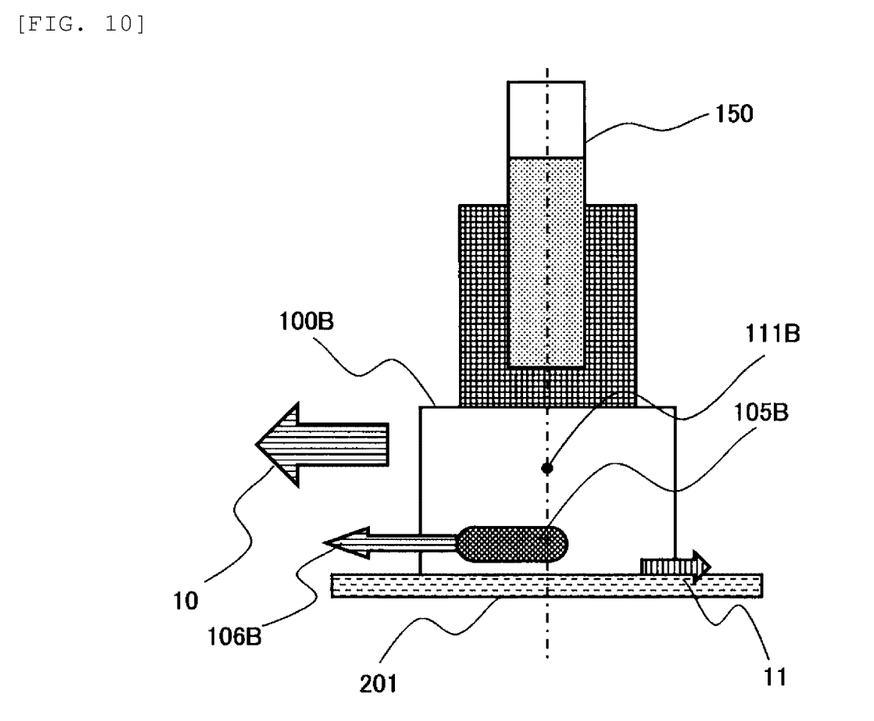
FIG. 10 is a diagram showing still another configuration of the specimen carrier according to the invention as viewed from the side surface side.
Figure 11:
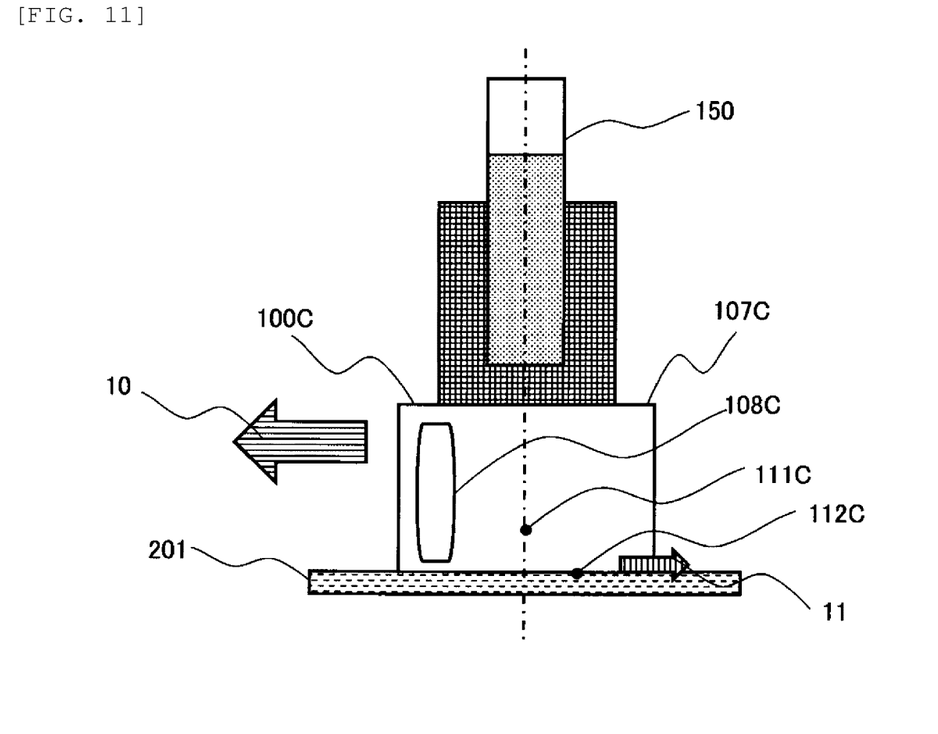
FIG. 11 is a diagram showing yet still another configuration of the specimen carrier according to the invention as viewed from the side surface side.

Next, another configuration of the specimen carrier will be described with reference to FIGS. 9 to 11. FIG. 9 is a diagram showing another configuration of the specimen carrier according to the invention as viewed from the bottom surface side, and FIGS. 10 and 11 are diagrams showing still another configuration of the specimen carrier according to the invention as viewed from the side surface side.

In FIG. 5 and the like described above, the high friction member 102 is used to shift the central axis 12 of the specimen carrier 100 and the center 14 of the frictional force 11, but the method for shifting the center 14 of the frictional force 11 is not limited thereto.

For example, as shown in FIG. 9, the center 14 of the frictional force 11 can be shifted depending on a shape of a bottom surface 110A of a specimen carrier 100A.

More specifically, the bottom surface 110A of the specimen carrier 100A is made uneven, and only a transport surface contact portion 103A provided in a region of the bottom surface 110A outside the central axis 12 and an outer peripheral portion 109A are in contact with the transport surface 201. With such a shape, no frictional force is generated at a transport surface non-contact portion 104A, which is a concave portion of the bottom surface 110A since the transport surface non-contact portion 104A does not slide on the transport surface 201, portions where the frictional force is generated by sliding on the transport surface 201 are the outer peripheral portion 109A and the transport surface contact portion 103A, which are convex portions of the bottom surface 110A, and thus the center 14 of the frictional force 11 can be shifted.

The transport surface contact portion 103A is provided at a position opposite to one of the two or more gripping portions 101 by 180°. The same applies to a permanent magnet 105B and a cavity 108C described below.

In the embodiment shown in FIG. 5 and the like and FIG. 9 described above, the traveling direction 10 is adjusted by the frictional force 11 generated by the interaction between the bottom surfaces 110 and 110A of the specimen carriers 100 and 100A and the transport surface 201, but other modes can also be used to adjust the traveling direction 10 of specimen carriers 100B and 100C.

For example, as shown in FIG. 10, the permanent magnet 105B, on which a transport electromagnetic force (transport force 106B) with respect to the specimen carrier 100B acts, is disposed in a manner shifted with respect to a physical center 111B of the specimen carrier 100B, the transport force 106B being generated by the magnetic pole 707.

In this mode, when the transport force 106B generated by the magnetic pole 707 acts on the permanent magnet 105B and the permanent magnet 105B starts to move, a side on which the permanent magnet 105B is provided starts to move so as to be a tip end side of the specimen carrier 100B. Therefore, the specimen carrier 100B can be aligned in a certain direction with respect to the transport direction, and the direction in which the large gripping force 21 acts most strongly can be aligned parallel to the traveling direction 10.

Further, as shown in FIG. 11, a physical center 111C of the specimen carrier 100C and a center of gravity 112C of the specimen carrier 100C may be shifted from each other.

For example, as shown in FIG. 11, the cavity 108C is provided in a position shifted from the physical center 111C in a bottom surface portion 107C constituting a bottom surface portion of the specimen carrier 100C, and thus the center of gravity 112C is shifted.

In this mode, when the specimen carrier 100C starts to move, a side of a lighter mass where the cavity 108C is formed starts to move so as to be a tip end side of the specimen carrier 100C. Therefore, the specimen carrier 100C can be aligned in a certain direction with respect to the transport direction, and the direction in which the large gripping force 21 acts most strongly can be aligned parallel to the traveling direction 10.

Instead of or in addition to the cavity 108C, a substance having a density higher than that of a material constituting the specimen carrier 100C may be provided in a position shifted from the physical center 111C of the specimen carrier 100C.

In addition, the modes shown in FIG. 5 and the like, FIG. 9, FIG. 10, and FIG. 11 described above can be appropriately combined.

Next, effects of the present embodiment will be described.

The transport device 700 according to the present embodiment described above includes the specimen carriers 100, 100A, 100B, and 100C each including two or more gripping portions 101 configured to support the specimen containers 150 having different diameters from different directions, and the transport surface 201 on which the specimen carriers 100, 100A, 100B, and 100C are to slide. The specimen carriers 100, 100A, 100B, and 100C each include the direction adjustment unit configured to adjust the traveling direction 10 of the specimen carriers 100, 100A, 100B, and 100C when the specimen carriers 100, 100A, 100B, and 100C slide on the surface of the transport surface 201, such that the direction of the force with which one of the two or more gripping portions 101 grips the specimen container 150 is opposite to the traveling direction of the specimen carriers 100, 100A, 100B, and 100C.

With such a configuration, the shake of the specimen container 150 at the time of stopping the specimen carriers 100A, 100B, and 100C is reduced, and therefore, without requiring a large-scale mechanism for controlling the direction of the specimen carriers 100, 100A, 100B, and 100C or a time for driving the mechanism, and without limiting the transport path, the throughput of the transport processing can be improved, and the cost of the system can be reduced.

Since the direction adjustment unit adjusts the traveling direction 10 of the specimen carriers 100 and 100A by the frictional force 11 between the bottom surface 110 of the specimen carriers 100 and 100A and the transport surface 201, the direction of the specimen carriers 100 and 100A can be easily and automatically aligned.

Further, the direction adjustment unit includes a plurality of regions (the high friction member 102 and the bottom surface 110) having different friction coefficients with respect to the transport surface 201 on the bottom surface 110 of the specimen carrier 100, or has a shape such that a part (the transport surface contact portion 103A) of the bottom surface 110A of the specimen carrier 100A is in contact with the transport surface 201, and thus the center 14 of the frictional force 11 can be shifted away from the central axis 12 of the specimen carriers 100 and 100A by sliding, and the direction of the specimen carriers 100 and 100A can be automatically adjusted.

In addition, the direction adjustment unit is formed by arranging the permanent magnet 105B, on which the transport electromagnetic force with respect to the specimen carrier 100B acts, in a manner shifted with respect to the physical center 111B of the specimen carrier 100B, or is formed by shifting the physical center 111C and the center of gravity 112C of the specimen carrier 100C from each other, and thus, the direction of the specimen carriers 100B and 100C can be easily and automatically aligned.

<Others>

The invention is not limited to the above embodiment, and various modifications and applications can be made thereto. The above-described embodiment has been described in detail in order to make the invention easy to understand, and the invention is not necessarily limited to those which have all the configurations described.

REFERENCE SIGNS LIST 10 traveling direction
11 frictional force (interaction)
12 central axis
13 rotational force
14 center
21 large gripping force
22 small gripping force
31 inertia
100, 100A, 100B, 100C specimen carrier (specimen transport carrier)
101 gripping portion
102 high friction member
103A transport surface contact portion (part)
104A transport surface non-contact portion
105 magnetic body
105B permanent magnet (magnetic body)
106B transport force
107C bottom surface portion
108C cavity
109A outer peripheral portion
110, 110A bottom surface
111B, 111C physical center
112C center of gravity
150 specimen container
201 transport surface (contact surface with bottom surface of carrier)
700 transport device
705 core
706 winding
707 magnetic pole
708 drive unit
709 calculation unit
710 detection unit
800 analysis device
900 control computer
1000 specimen examination automation system

The invention claimed is:

1. A specimen transport device, comprising:
a carrier including two or more gripping portions, disposed above the carrier, configured to open and close and support specimen containers having different diameters from different directions by gripping the specimen containers; and
a transport surface on which the carrier is to slide,
wherein the carrier includes a direction adjustment unit configured to adjust a traveling direction of the carrier when the carrier slides on a surface of the transport surface, such that a direction of a force with which one of the two or more gripping portions grips the specimen container is opposite to the traveling direction of the carrier,
wherein the direction adjustment unit is configured to adjust the traveling direction of the carrier by an interaction between a bottom surface of the carrier and the transport surface, and
wherein the direction adjustment unit includes a plurality of regions having different friction coefficients with respect to the transport surface on the bottom surface of the carrier.

2. The specimen transport device according to claim 1, wherein the direction adjustment unit has a shape such that a part of the bottom surface of the carrier is in contact with the transport surface.

3. The specimen transport device according to claim 1, wherein the direction adjustment unit is formed by disposing a magnetic body, on which a transport electromagnetic force with respect to the carrier acts, in a manner shifted with respect to a physical center of the carrier.

4. The specimen transport device according to claim 1, wherein the direction adjustment unit is formed by shifting a physical center and a center of gravity of the carrier from each other.

5. A specimen transport carrier for gripping a test body in which a specimen is accommodated, the specimen transport carrier comprising:
two or more gripping portions, disposed above the carrier, configured to open and close and support specimen containers having different diameters from different directions by gripping the specimen containers; and
a direction adjustment unit configured to adjust a traveling direction of the specimen transport carrier when the specimen transport carrier slides on a surface of a transport surface, such that a direction of a force with which one of the two or more gripping portions grips the specimen container is opposite to the traveling direction of the specimen transport carrier,
wherein the direction adjustment unit is configured to adjust the traveling direction of the carrier by an interaction between a bottom surface of the carrier and the transport surface, and
wherein the direction adjustment unit includes a plurality of regions having different friction coefficients with respect to the transport surface on the bottom surface of the carrier.

* * * * *